United States Patent Office 2,699,178
Patented Jan. 11, 1955

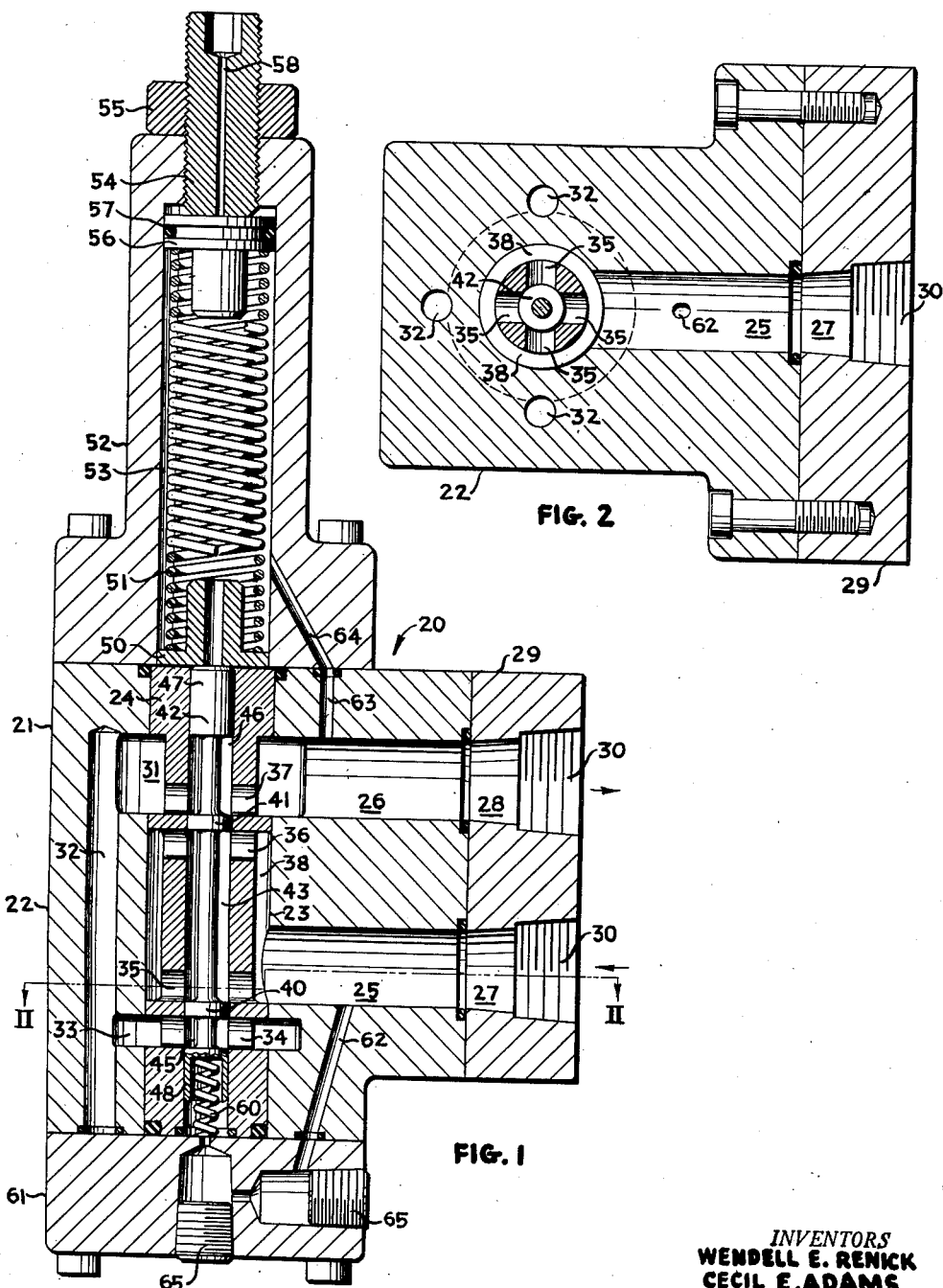

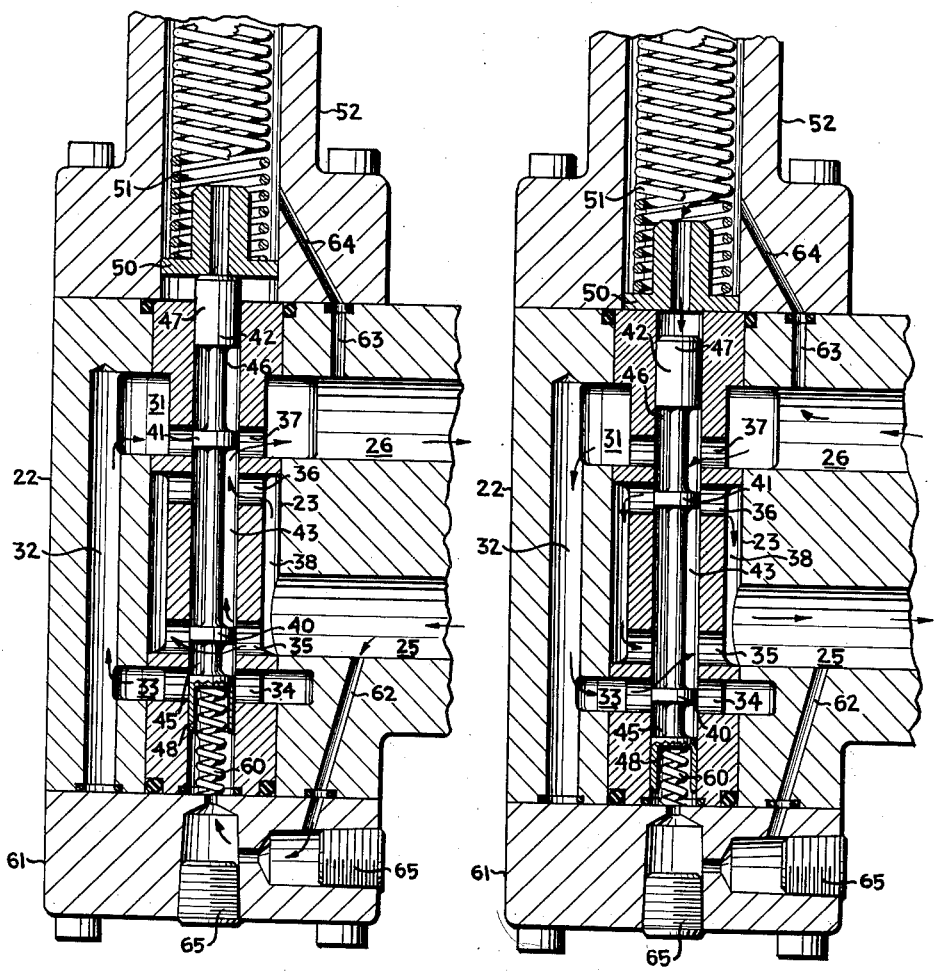

2,699,178

RELIEF, SEQUENCE, AND UNLOADER VALVE

Cecil E. Adams and Wendell E. Renick, Columbus, Ohio, assignors to The Denison Engineering Company, Columbus, Ohio Application September 13, 1952, Serial No. 309,502

7 Claims. (Cl. 137—493)

This invention relates generally to hydraulic apparatus and is more particularly directed to fluid pressure control valves of the type suitable for use as relief, sequence and unloader valves.

An object of this invention is to provide an improved control valve which will govern the pressure in a hydraulic system within close limits and one which will be sensitive, the valve being also operative to permit reverse flow therethrough in the event the occasion demands such operation.

Another object of the invention is to provide a fluid pressure control valve of the pressure relief type having a spool valve for controlling fluid flow from one portion of a hydraulic system to another, the spool valve being actuated by fluid pressure in opposition to a resilient force, which force may be adjusted to control the pressure at which the spool valve will permit communication between the sections of the hydraulic system.

Another object of the invention is to provide a relief valve having a casing with inlet and outlet ports and a spool valve disposed within the casing to control communication between the inlet and outlet ports, the spool valve being yieldably retained in position to prevent communication between the inlet and outlet ports but being responsive to pressure differences in the inlet and outlet ports to move to establish communication between such ports, the opposition to movement of the spool to provide for fluid flow from the inlet to the outlet being greater than the opposition to movement of the spool to permit reverse flow.

A further object of the invention is to provide a relief valve having a casing with inlet and outlet ports, a spool valve disposed in said casing and being operative in one position to prevent communication between the inlet and outlet ports, the spool valve being movable to either side of such position to permit fluid flow between the ports, resilient means being provided in the casing to resist movement of the spool in either direction from the said position, the fluid pressure from the inlet and outlet ports being applied to opposite portions of the spool valve to move the same in opposition to the yieldable forces tending to prevent movement of the spool from the position in which communication between the ports is obstructed.

Further objects and advantages of the present invention will be apparent from the following description, reference being had to the accompanying drawings wherein a preferred form of embodiment of the invention is clearly shown.

In the drawings:

Fig. 1 is a vertical longitudinal sectional view taken through a fluid pressure control valve formed in accordance with the present invention, the valve being shown in position to prevent fluid flow between the inlet and outlet ports;

Fig. 2 is a horizontal sectional view taken through the valve on the plane indicated by the line II—II of Fig. 1;

Figs. 3 and 4 are partial vertical longitudinal sectional views showing the mechanism of the valve in different positions of operation, Fig. 3 showing the valve in condition to permit fluid flow from the inlet to the outlet port thereof and Fig. 4 showing the parts of the valve in position to permit reverse flow through the valve.

Referring more particularly to the drawings, numeral 20 designates the fluid pressure control valve in its entirety. This valve, in the form illustrated, includes a casing 21 having a body 22 provided with a longitudinal bore 23 for the reception of a sleeve-like liner 24. The body 22 is also provided at longitudinally spaced ports with laterally extending passages 25 and 26 which communicate with the bore 23. The passage 25 comprises the inlet passage while passage 26 constitutes the outlet passage of the valve. A sub-plate 29 is secured to the side of the valve to which the passages 25 and 26 open, the sub-plate being provided with ports 27 and 28 which register with the passages 25 and 26, respectively, when the sub-plate is secured to the body 22. Ports 27 and 28 are threaded as at 30 to permit the connection of fluid conductors thereto when the valve is connected in a hydraulic system. In registration with the passage 26, the body is provided with a chamber 31, the body being further provided with longitudinal passages 32 which intersect the chamber 31 and establish communication between this chamber and a second chamber 33 formed in the body adjacent to but spaced from the passage 25. The liner 24 is formed with a plurality of longitudinally spaced, laterally extending ports 34 to 37, inclusive, the ports 34 registering with the chamber 33 and the ports 37 registering with the chamber 31. The outer surface of the sleeve 24 has a groove 38 which registers with and connects the laterally extending ports 35 and 36. This chamber, passage, groove, and port arrangement provides a main fluid passage between the inlet and outlet ports and supplementary passages also extending between these ports. The spacing of the ports 34 and 35 constitute one set and the spacing between the ports 36 and 37 which constitute a second set provides sealing areas for cooperation with spaced heads 40 and 41 formed on a spool element 42 which is disposed for longitudinal movement in the liner 24. The spool 42 has an external groove 43 between the heads 40 and 41 and end grooves 45 and 46 at the outer ends of the heads 40 and 41. The spool element 42 is further provided with piston sections 47 and 48 at its ends. When the spool 42 is disposed in the position shown in Fig. 1, the heads 40 and 41 prevent communication between the inlet and outlet ports. This position of the spool is referred to hereafter as the first position. The spool is yieldably maintained in this position through engagement of the piston 47 with an adaptor 50 disposed at the upper end of the sleeve 24 and urged toward the sleeve by a coil spring 51.

This spring is disposed within a cap 52 secured to the upper end of the body 22. The cap has a chamber 53 for the reception of the spring 51, this chamber constituting a continuation of the bore 23. The tension of the spring 51 is controlled by an adjusting screw 54 threaded into the upper end of the cap 52, the position of the adjusting screw being maintained by a locknut 55. Screw 54 engages a spring abutment 56 which is slidable in the chamber 53 formed in the cap, the abutment having a sealing ring 57 disposed in a groove therein to prevent the flow of fluid around the abutment and its escape through a breather opening 58 formed in the screw 54. The spring 51 urges the adaptor 50 downwardly in the chamber 53, movement of this member in this direction being limited through its engagement with the upper end of the liner 24. The adaptor 50 forms a shoulder in the path of movement of the spool element 42 and tends to limit the movement of this spool element in an upward direction. When the valve is idle or operating under pressures below the setting of spring 51, the spool is maintained in engagement with this shoulder by a small coil spring 60, arranged at the lower end of the spool between the inner end of a recess formed in the spool, and a bottom cap 61 which is secured to the lower end of the body 22. This cap cooperates with the other cap to maintain the longitudinal position of the liner 24 in the body 22. Cap 61 is provided with a plurality of openings which cooperate with a small passage 62 formed in the body 22 to establish communication between the inlet port 25 and the lower end of the bore in the sleeve 24.

This passage 62 permits fluid at inlet port pressure to be introduced to the lower end of the bore in the liner and applied to the piston head 48 of the spool valve. This fluid pressure tends to move the spool valve in an upward direction against the force exerted by the spring 51. The body 22 is provided with a second reduced passage 63 which cooperates with another passage 64 formed in the cap 52 to admit fluid from the outlet port 26 to the chamber 53, this fluid being applied through an opening in adaptor 50 to the upper end of the spool valve 42. Fluid so applied to the upper end of the spool valve 42 tends to move this valve in a downward direction against the opposition of the spring 60. As previously mentioned, the parts of the valve occupy the position shown in Fig. 1 under normal conditions. When the pressure increases, however, in the inlet port 25, this pressure will be applied through the passage 62 to the lower end of the spool element 42 and will tend to move this spool in an upward direction. As previously mentioned, movement in this direction is opposed by the force of the spring 51. When fluid pressure in the inlet port increases sufficiently, however, the force of the spring 51 will be overcome and the spool element will move in an upward direction until the heads 40 and 41 of the spool element move beyond the lower edges of the ports 35 and 37. When the spool reaches this position, communication will be established between passages 25 and 26, as shown by the arrows in Fig. 3. The fluid will flow through the main passages established by grooves 38, 43, and 45 and ports 35, 36, and 37. Flow will also be established through the supplementary passages through groove 45, ports 34, chamber 33, passages 32, and chamber 31. This fluid flow will be maintained as long as the fluid pressure in passage 25 is sufficient to hold spool 42 elevated against the action of spring 51. When the fluid pressure recedes, however, spring 51 will return spool 42 to its first position in which the heads 40 and 41 obstruct communication between passages 25 and 26.

In the event the fluid pressure in the outlet port 26 exceeds the pressure in passage 25, the pressure in the outlet port will be applied to the upper end of the spool 42 and will move this spool in opposition to the force of spring 60 until the heads 40 and 41 move to positions below the upper edges of ports 34 and 36. The spool is shown in such a position in Fig. 4 of the drawings. At this time, fluid may flow from the outlet port 26 through the main and supplemental passages to the inlet port 25. The spring 60 is a relatively weak spring so that a very slight increase in the pressure in the outlet port beyond the pressure in the inlet port will provide for reverse flow through the valve. This condition rarely occurs but, in such event, the provision of reverse flow will eliminate injury to the valve or other portions of the hydraulic system.

It will be noted from Figs. 1, 3, and 4 that normally the spool 42 occupies its first position and is maintained in such position by the counter-forces of the springs 60 and 51. The adaptor member 50 serves to locate the spool in the first position as long as the fluid pressures in the inlet and outlet ports are below predetermined values, while the springs permit fluid pressure at opposite ends of the spool to move this element to positions at either side of the first position to establish fluid flow from the inlet to the outlet port or vice versa. The openings in cap 61 are closed by plugs 65.

While the form of embodiment of the present invention as herein disclosed constitutes a preferred form, it is to be understood that other forms might be adopted, all coming within the scope of the claims which follow.

We claim:

1. A pressure relief valve comprising a body having a longitudinal bore and longitudinally spaced ports communicating therewith, said body having passages establishing additional communication between said ports and the adjacent ends of said bore; a spool disposed for movement in said bore, said spool having an external groove and being operative in a first longitudinal position in said bore to prevent communication between said spaced ports, the groove in said spool serving when said spool is disposed in a position at either side of said first position to establish communication between said ports; spring means in said body at each end of said spool to yieldably resist movement thereof toward such ends; means for preventing said spring means from moving said spool beyond said first position; and passage means for applying fluid from said longitudinally spaced ports to the adjacent ends of said spool.

2. A pressure relief valve comprising a body having a longitudinal bore and longitudinally spaced sets of ports communicating therewith, the ports of said sets being spaced longitudinally of the bore, said body having passage means establishing additional communication between the ends of the bore and the adjacent ports; a spool element disposed for longitudinal movement in said bore, said spool having spaced heads preventing communication between the ports of said sets in a first longitudinal position of said spool in said bore; the space between said heads serving when said spool element is disposed in a position at either side of said first position to establish communication between said sets of ports; spring means resisting movement of said spool element in either direction from said first position; means for preventing the movement of said spool to either side of said first position by said spring means; and passage means extending from said ports to the adjacent ends of said bore to apply fluid at the pressures in said ports to the ends of said spool to move the same in opposition to said springs.

3. A pressure relief valve comprising a body with a longitudinal bore and longitudinally spaced inlet and outlet ports, said body having passageways establishing communication between the ends of the bore and the adjacent ports, said inlet and outlet ports communicating with said bore at spaced points; a spool element disposed for longitudinal movement in said bore, said spool element having a head with a groove at either side thereof, said head preventing communication between said inlet and outlet ports in a first longitudinal position of said spool in said bore, the grooves in said spool establishing communication between said inlet and outlet port when said spool is disposed in positions at either side of said first position; a relatively strong spring at one end of said bore and applying force to said spool to yieldably oppose movement of said spool toward such end of the bore; a weak spring at the opposite end of said bore and engaging said spool to yieldably oppose movement of said spool toward such end of the bore; means for preventing the movement of said spool to either side of said first position by said springs; and means for applying fluid at inlet and outlet port pressures to the adjacent ends of said spool.

4. A pressure relief valve comprising a body having a bore and inlet and outlet ports communicating therewith at longitudinally spaced points; a spool element disposed for movement in said bore, said element having a head portion preventing communication between said inlet and outlet ports when said spool element is in a first longitudinal position, said spool establishing such communication when moved to positions at either side of said first position; passage means in said body for applying fluid at inlet port pressure to one end of said spool element and at outlet port pressure to the other end thereof; a relatively strong spring at the end of said spool opposite that to which fluid at inlet port pressure is applied; a relatively weak spring at the opposite end of said spool; and means for preventing either spring from moving said spool beyond said first position.

5. A pressure relief valve comprising a body with a longitudinal bore and inlet and outlet ports spaced longitudinally thereof, said body having additional passages connecting the end portions of said bore, the total cross-sectional area of said additional passages being in excess of that of said bore; a spool element disposed for movement in said bore, said spool having head portions preventing communication between said inlet and outlet ports through said bore and additional passages when said spool is in a first longitudinal position, said spool establishing such communication when moved to positions at either side of said first position; passage means in said body for applying fluid at inlet port pressure to one end of said spool element and at outlet port pressure to the other end thereof; a spring of predetermined strength at one end of said spool to yieldably resist movement thereof by said inlet port pressure; and a second spring at the opposite end of said spool to yieldably resist movement thereof by said outlet port pressure.

6. A pressure relief valve comprising a body with a longitudinal bore and inlet and outlet ports spaced longitudinally thereof, said body having passages establishing a plurality of fluid conduits between said inlet and outlet ports; a spool element disposed for sliding movement in said bore, said spool having a plurality of heads operative in a first position of said spool to prevent communication between said inlet and outlet ports through said bore and passages, movement of said spool to either side of said first position establishing communication between said ports; passage means leading from the inlet and outlet ports to the adjacent ends of said bore to apply fluid at the pressures in said ports to the opposite ends of said spool element; and spring means at the ends of said spool element to yieldably resist movement thereof by said fluid pressures, the spring opposing spool movement by outlet port pressure being relatively weak.

7. A pressure relief valve comprising a body with a longitudinal bore and inlet and outlet ports spaced longitudinally thereof, said body having passages establishing a plurality of fluid conduits between said inlet and outlet ports; a spool element disposed for sliding movement in said bore, said spool having a plurality of heads operative in a first position of said spool to prevent communication between said inlet and outlet ports through said bore and passages, movement of said spool to either side of said first position establishing communication between said ports; passage means leading from the inlet and outlet ports to the adjacent ends of said bore to apply fluid at the pressures in said ports to the opposite ends of said spool element; spring means at the ends of said spool element to yieldably resist movement thereof by said fluid pressures; and means for adjusting the spring which opposes spool movement by inlet port pressure.

References Cited in the file of this patent

UNITED STATES PATENTS

| 1,725,539 | Riley | Aug. 20, 1929 |
| 1,856,996 | Heise | May 3, 1932 |
| 2,059,808 | Robart | Nov. 3, 1936 |